United States Patent Office 3,514,510
Patented May 26, 1970

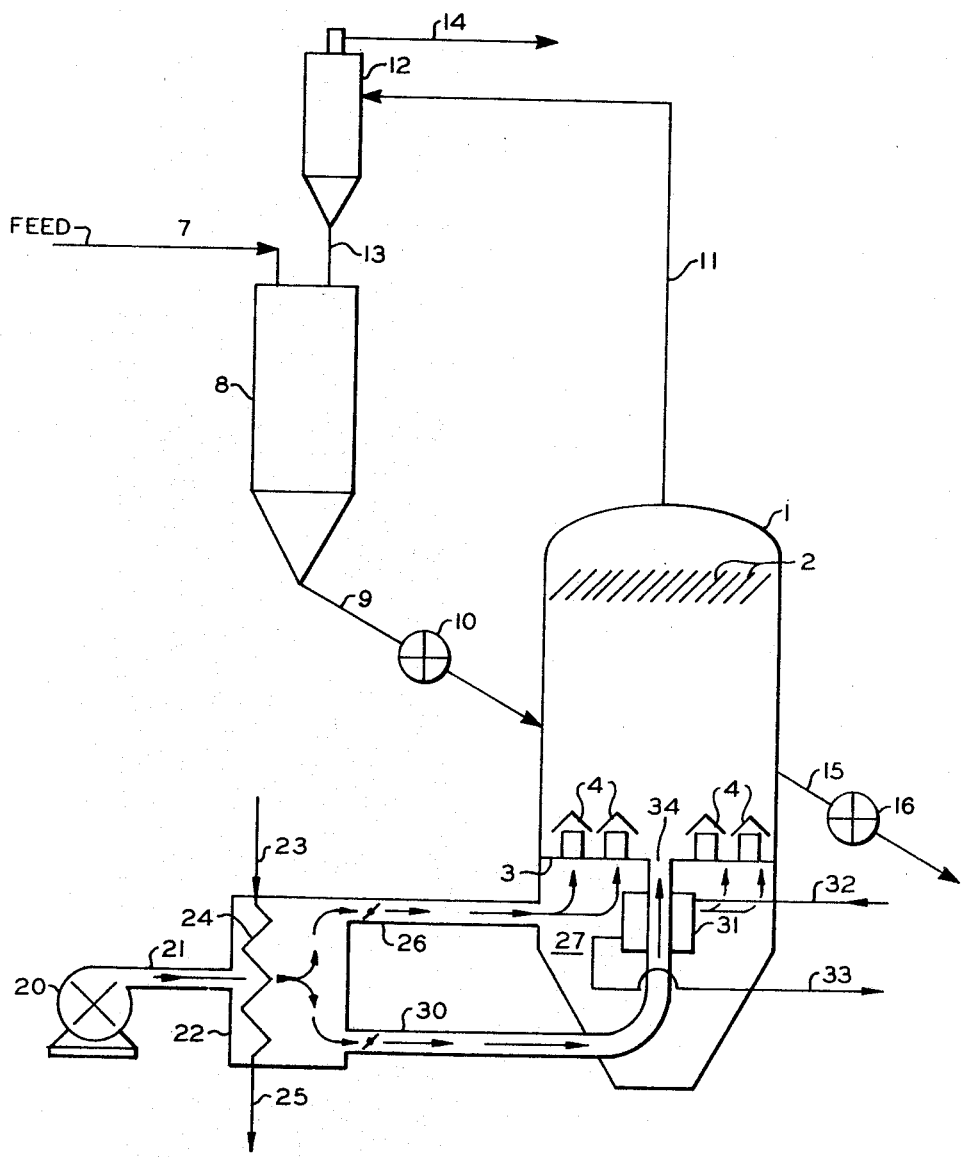

3,514,510
METHOD FOR AGGLOMERATING POLYMER FINES
Alfred A. Hoffman, Jr., Bartlesville, Okla., assignor to Phillips Petroleum Company, a corporation of Delaware
Filed Nov. 22, 1967, Ser. No. 685,185
Int. Cl. B01j 2/16
U.S. Cl. 264—117    4 Claims

ABSTRACT OF THE DISCLOSURE

A method for agglomerating polymer fines in a fluidizing bed maintained in the fluid state by introducing into the fluidized bed at least two portions of fluidizing gas wherein one of the portions of fluidizing gas is provided in a minor amount and heated to or above the softening point of the polymer and thereby causing the polymer fines to soften and then agglomerate, while a second portion of the fluidizing gas is maintained at a temperature below the softening point of the polymer.

---

This invention relates to a new improved method for agglomerating polymer fines.

Heretofore, polymer has been formed using a polymerization process wherein the polymer is formed as a plurality of small particles dispersed in the polymerization diluent. In some such processes, very tiny polymer particles, i.e., of a size which passes through a 100 mesh sieve (Tyler Sieve Series) are formed which cannot be handled or transported without substantial loss thereof. Oftentimes, these polymer fines are separated by use of bag filters and/or cyclone separators and then discarded. In some cases the amount of polymer fines discarded amounts to 1 percent or more of the polymer actually produced so that there is a substantial economic savings in retaining these polymer fines as part of the final polymer product.

One approach to this problem is reblending the polymer fines with the final polymer product, but a significant proportion of these fines is still lost in the handling and transportation involved in the reblending process so that the problem relating to the polymer fines would merely be shifted to another portion of the plant.

A solution to the problem would be to coat the polymer fines with a wetting solution, thereby causing the fines to agglomerate into larger particles. The use of the wetting solution not only entails the additional costs of the wetting solution itself and its application, but also requires additional treating apparatus such as driers and the like, so that in the final analysis it is not clearly more economical to use an extraneous wetting solution to recover the polymer fines.

Yet another solution is to simply heat the polymer fines at least to their softening point so that they will agglomerate in this manner into larger particles. This could be done in a fluidized bed wherein the bed is heated to at least the softening point of the polymer. However, heretofore the prior art relating to fluidized beds of polymer particles has taught that temperatures at or above the softening point of the polymer in a fluidized bed results in the formation of a large, soft, sticky mass of polymer. U.S. Pat. No. 3,295,221 illustrates this problem.

According to this invention, polymer fines are agglomerated without using an extraneous solution but with the use of a fluidized bed. By this invention a fluidized bed is employed without forming a large, soft, sticky mass of polymer.

By this invention, the fluidizing vapor introduced into the fluidized bed to maintain the bed in the fluid state is split into at least two portions, at least one of the portions being a minor amount based on the total of the vapor being introduced into the fluidized bed, and this portion is heated to or above the softening point of the polymer while the remainder of the vapor introduced into the bed is maintained at a temperature below the softening point of the polymer. The portion of vapor which is heated to or above the softening point of the polymer is introduced into the bed in a central portion thereof. By this process, a localized zone in the fluidized bed is heated to a temperature where agglomeration of the particles is readily effected, but this localized portion is controlled and limited by a preponderance of fluidizing vapor and polymer particles which are both at a temperature below the softening point of the polymer. In this manner the formation of a large mass of soft, sticky polymer is avoided, but yet agglomeration of the polymer fines is still achieved. The agglomerated fines, being heavier particles, tend to settle near the bottom of the fluidized bed and can be readily removed therefrom in a conventional manner leaving non-agglomerated particle fines still in the fluidized bed to work into the localized zone of super-heating and become agglomerated.

The polymer agglomerates produced by the method of this invention are useful in making many articles of commerce. For example, when the polymer particles are formed from 1-olefins such as ethylene and propylene, the particles can be injection molded in a conventional manner to form garbage cans, wastepaper baskets, and the like. Other similar utilities for other polymer agglomerates formed according to the process of this invention will be obvious to those skilled in the art.

Accordingly, it is an object of this invention to provide a new and improved method for agglomerating polymer particles. It is another object of this invention to provide a new and improved method for reducing polymer losses in a polymerization process wherein a substantial amount of the polymer formed in that process consists of very small solid particles. It is another object of this invention to provide a new and improved process for agglomerating polymer particles in a fluidized bed without the use of an extraneous solvent or solution and without the formation of a large mass of sticky, soft polymer.

Other aspects, objects, and the several advantages of this invention will be apparent to those skilled in the art from the description and appended claims.

The drawing shows a system embodying the method of this invention.

In the drawing, there is shown a fluidized bed apparatus 1 containing internal deflector plates 2 and a perforated grid 3 which has open but capped risers 4 fixed over the perforations in that plate.

Polymer fines are fed through line 7 to hopper 8 and from hopper 8 through line 9 and rotary valve 10 into the fluidized bed in 1. Fluidizing gas is removed from 1 through line 11 and into cyclone 12 wherein particle fines are separated from the gas and passed by line 13 into hopper 8. The fluidizing gas from which most of the polymer fines have been removed is removed from cyclone 12 by way of line 14 and passed through bag filters or other filtering media for removal of any residual polymer fines. The fluidizing gas can be disposed of by venting to the atmosphere or recycling to the fluidized bed apparatus 1. Agglomerated polymer particles, which will be of a size which will not pass through 100 mesh sieve (Tyler Sieve Series) are removed from 1 through line 15, the removal being controlled by rotary valve 16.

A supply of fluidizing gas such as air, or desirably an inert gas, is provided by blower 20. Blower 20 passes the gas through line 21 and heat exchanger 22. A heating fluid such as steam is passed through line 23, coil 24, and line 25 to heat the gas from line 21 to a temperature above ambient, i.e., about 35° F. below but preferably at least 10° F. below the softening point of the polymer. The thus-heated gas stream is then split into two portions, the major amount of the gas comprising the first portion which is passed through line 26 into gas space 27 and thereby passed upwardly through plate 3 and risers 4 to be distributed across substantially the whole lateral cross-section of the fluidized bed. The gas in line 26 (and therefore the gas passed into the fluidized bed) constitutes from about 70 to about 95 percent, preferably from about 80 to about 90 percent, by volume, of the total amount of gas passing through line 21, i.e., all the gas being introduced into the fluidized bed. The remainder of the gas from line 21 which is not passed by line 26 is separated into the second portion which passes into line 30. A portion of line 30 is externally heated by heat exchanger 31 which has a heating fluid such as super heated steam supplied thereto by way of line 32 and removed therefrom by way of line 33. Thus, the second portion of gas passing through line 30 is indirectly heated by way of heat exchanger 31 and then introduced into a central portion of the fluidized bed by way of aperture 34 in plate 3. The gas passing through line 30 and heat exchanger 31 is heated at least to the softening point of the polymer in the fluidized bed and preferably to a temperature of from the softening point of the polymer to about 200° F. above said softening point. The gases passing through lines 26 and 30 can be the same or different gases, e.g. both can be air or one air and the other nitrogen.

By the introduction of the heated gas via line 30 into a central portion of the fluidized bed, a localized central portion of the fluidized bed is created which is heated to a temperature which is at least at the temperature of the softening point of the polymer. In this manner a portion of the polymer fines in the fluidized bed is heated to or above the softening point thereby causing the fines to soften and agglomerate with one another when brought into contact in this softened condition.

After the particles agglomerate sufficiently, they tend to settle downwardly in the fluidized bed and a current of such particles toward exit line 15 is maintained by removing particles from near the bottom of the fluidized bed through line 15 while at the same time feeding additional polymer fines into the top of the fluidized bed by way of line 9. Thus, the polymer fines which move into the localized central portion of the fluidized bed are heated to at least the softening point of the polymer, gradually agglomerate, and gradually settle toward the bottom of the fluidized bed while being drawn toward exit line 15 for removal. This sequence of stages prevents long residence times of the agglomerated particles in the localized central portion wherein super-heating takes place and prevents the buildup of a large mass of soft, sticky polymer.

The softening point of the polymer can be determined in accordance with conventional methods. The softening point as used in this invention is determined by ASTM test procedure D1525-58T. Representative softening points as determined by this procedure are 180 to 230° F. for a homopolymer of ethylene having a density of less than 0.94 gram per cubic centimeter at 77° F.; 250 to 260° F. for a homopolymer of ethylene having a density of at least 0.94 gram per cubic centimeter at 77° F.; and 300 to 310° F. for a homopolymer of propylene.

Generally, any polymer which can be made into a very fine particle size, and which has a softening point as defined by the test procedure set forth hereinabove, can be employed in this invention. Presently preferred polymers are resinous plastic and rubbery polymers, particularly homopolymers, copolymers, and/or mixtures of two or more homopolymers and/or copolymers formed from one or several mono-1-olefins having from 2 to 8 carbon atoms per molecule, inclusive. Suitable 1-olefins include ethylene, propylene, butene-1, octene-1, and the like.

Generally, any known fluidizing vapor or gas can be employed in the process of this invention, such vapors including oxygen-containing gases such as air, pure or substantially pure oxygen, and the like, as well as gases which are substantially inert to the polymer fines such as nitrogen, argon, helium, steam, carbon dioxide, hydrocarbon gases, and the like. Reducing gases such as hydrogen and the like can also be employed depending upon various considerations such as in particular combinations of polymers and gases where, by exposure, the chemical and/or physical character of the polymer may be altered, and the like.

EXAMPLE

A homopolymer of ethylene having a softening point of from 250 to 260° F. (ASTM D1525-58T) and in the form of finely divided particles which will pass through a 100 mesh sieve (Tyler Sieve Series) is employed in the apparatus shown in the drawing using inert gas as the fluidizing vapor. The fluidized bed chamber is cylindrical and has a lateral cross-sectional diameter of about 1.5 feet. This chamber is about 6 feet tall. The fluidized bed formed in the chamber has a settled bed height of about 1 foot at 30 pounds per cubic foot bulk density of the polymer. Polymer fines are fed to the fluidized bed and agglomerated particles are removed from the fluidized bed both at a rate of about 1 pound per minute. The residence time of the polymer particles in the fluidized bed is about 30 minutes.

Manufactured inert gas (nitrogen-carbon dioxide) is introduced into the fluidized bed through line 26 at a rate of 48 standard cubic feet per minute, this flow constituting about 90 volume percent of the 53 standard cubic feet per minute of gas passing through line 21, i.e., 90 volume percent of the total flow rate of air passing into the fluidized bed. The air in both lines 26 and 30 is heated to about 230° F. in heat exchanger 22.

The about 10 volume percent of gas passing through line 30 is heated by heat exchanger 31 to a temperature of about 290° F. before it is introduced into the fluidized bed through aperture 34 in plate 3.

The combined gases create and maintain a fluidized bed of fine particles at a gas velocity of about one half foot per second, and, after the heating, melting, agglomerating and settling steps have taken place, the exiting gas and polymer particles are thermally equilibrated at a temperature of about 200° F.

The agglomerated particles removed from the fluidized bed through line 15 are retained on a 100 mesh sieve (Tyler Sieve Series) and are sufficiently large and dense to be readily handled and transported, e.g., by way of a pneumatic conveyor, without substantial loss of polymer. The agglomerated particles are then blended with other polymer product, and the blend produced is utilized as the final polymer product of the overall polymerization process.

Reasonable variations and modifications are possible within the scope of this disclosure without departing from the spirit and scope thereof.

I claim:
1. A method for agglomerating polymer fines comprising providing a fluidized bed of said polymer fines, providing at least one source of fluidizing gas, introducing at least one first portion of said gas into said fluidized bed in fluidizing amounts and at a fluidizing rate, said introduction being made across substantially the lateral cross section of the fluidized bed, said at least one first portion of said fluidizing gas being heated to a temperature above ambient but at least 10° F. below the softening point of the polymer constituting said polymer fines, heating at least one second portion of said fluidizing gas to a temperature of at least the softening point of the polymer constituting said polymer fines, introducing said at least one second portion of said heated fluidizing gas into said fluidized bed in an amount and at a rate such that the at least one first portion constitutes from about 70 to about 95 percent by volume of the total gas introduced into said fluidized bed, said at least one second portion being introduced into said fluidized bed substantially at a central portion of said lateral cross section of said fluidized bed and thereby heating a portion of said polymer fines in said fluidized bed to or above the softening point of the polymer constituting said polymer fines thereby causing said polymer fines to soften and agglomerate without the formation of large mass of soft, sticky polymer, removing agglomerated polymer fines from said bed and adding polymer fines to said bed to maintain the desired fluidized bed depth.

2. The method according to claim 1 wherein said polymer fines are of a size which passes through a 100 mesh sieve (Tyler Sieve Series), said fluidizing gas is split into first and second portions, said first portion constitutes from about 80 to about 90 percent by volume of said fluidizing gas, said second portion constitutes from about 10 to about 20 percent by volume of said fluidizing gas, said second portion of said fluidizing gas is heated to a temperature of from the softening point of the poymer consitiuting the polymer fines to about 200° F. above said softening point.

3. The method according to claim 1 wherein said polymer is formed from at least one polymer composed of at least one 1-olefin having from 2 to 8 carbon atoms per molecule, inclusive, and said fluidizing gas is at least one of oxygen- containing gas, reducing gas, and gas that is substantially inert to the polymer constituting said polymer fines.

4. The method according to claim 2 wherein said polymer fines are composed of at least one of homopolymer of ethylene, homopolymer of propylene, and copolymer of at least two of ethylene, propylene, and butene-1, said fluidizing gas is from a single source and is split into two portions, and said fluidizing gas is substantially air.

References Cited

UNITED STATES PATENTS

| | | | |
|---|---|---|---|
| 2,586,818 | 2/1952 | Harms. | |
| 2,874,950 | 2/1959 | Pyzel | 263—53 |
| 3,295,221 | 1/1967 | Joy | 34—10 |
| 3,386,182 | 6/1968 | Lippert | 34—10 |

ROBERT F. WHITE, Primary Examiner

J. R. HALL, Assistant Examiner

U.S. Cl. X.R.

34—10